US009058539B2

(12) United States Patent
Seikh (10) Patent No.: US 9,058,539 B2
(45) Date of Patent: Jun. 16, 2015

(54) SYSTEMS AND METHODS FOR QUANTIFYING GRAPHICS OR TEXT IN AN IMAGE (71) Applicant: CANON KABUSHIKI KAISHA, Tokyo (JP)

(72) Inventor: Attaullah Seikh, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 13/864,072

(22) Filed: Apr. 16, 2013

(65) Prior Publication Data
US 2014/0307962 A1  Oct. 16, 2014

(51) Int. Cl.
G06K 9/00 (2006.01)
G06K 9/46 (2006.01)
G06T 9/00 (2006.01)
G06T 7/00 (2006.01)
H04N 19/172 (2014.01)
H04N 19/12 (2014.01)
H04N 19/136 (2014.01)

(52) U.S. Cl.
CPC ............... G06K 9/4642 (2013.01); G06T 9/00 (2013.01); G06T 7/00 (2013.01); H04N 19/172 (2014.11); H04N 19/12 (2014.11); H04N 19/136 (2014.11)

(58) Field of Classification Search
None
See application file for complete search history.

(56) References Cited

U.S. PATENT DOCUMENTS

| 4,504,972 A | 3/1985 | Scherl |
| 4,856,075 A | 8/1989 | Smith |
| 5,596,655 A | 1/1997 | Lopez |
| 5,742,704 A * | 4/1998 | Suzuki et al. ................ 382/176 |
| 5,745,596 A | 4/1998 | Jefferson |
| 6,175,425 B1 | 1/2001 | Khorram |
| 6,289,122 B1 | 9/2001 | Karidi |
| 6,360,006 B1 | 3/2002 | Wang |
| 6,385,338 B1 | 5/2002 | Saito |
| 6,778,291 B1 | 8/2004 | Clouthier |
| 7,365,880 B2 | 4/2008 | Yamamoto |
| 7,379,594 B2 * | 5/2008 | Ferman et al. ................ 382/176 |
| 7,864,365 B2 | 1/2011 | Campbell |
| 7,876,959 B2 | 1/2011 | Matsuda |
| 7,889,932 B2 | 2/2011 | Campbell |
| 7,899,248 B2 * | 3/2011 | Liu ............................... 382/173 |
| 2003/0133610 A1 | 7/2003 | Nagarajan |
| 2003/0198386 A1 | 10/2003 | Luo |

(Continued)

OTHER PUBLICATIONS

Pan, Feng; Huang, Jiwu; Discriminating computer graphics images and natural images using hidden Markov tree model, IWDW'10 Proceedings of the 9th international conference on Digital watermarking, 2010.

(Continued)

Primary Examiner — Bhavesh Mehta
Assistant Examiner — Feng Niu
(74) Attorney, Agent, or Firm — Canon U.S.A., Inc. IP Division (57) ABSTRACT Systems and methods for quantifying an image generate a grayscale histogram of an image, wherein the grayscale histogram includes a respective number of pixels for a plurality of histogram values; determine a respective percentage of pixels in each of the histogram values based on the numbers of pixels for the respective histogram value and a total number of pixels in the image; compare the respective percentages of the histogram values to a first threshold; add the respective percentages that exceed the first threshold to a total percentage; and compare the total percentage to a second threshold.

15 Claims, 7 Drawing Sheets

(56) References Cited

U.S. PATENT DOCUMENTS

| | | |
|---|---|---|
| 2004/0095601 A1 | 5/2004 | Ozawa |
| 2007/0047812 A1 | 3/2007 | Czyszczewski |
| 2008/0310721 A1 | 12/2008 | Yang |
| 2010/0074526 A1 | 3/2010 | Campbell |
| 2011/0244919 A1 | 10/2011 | Aller |
| 2012/0039534 A1 | 2/2012 | Malik |
| 2012/0189202 A1 | 7/2012 | Kan |
| 2012/0207390 A1 | 8/2012 | Sayers |
| 2012/0224765 A1 | 9/2012 | Kim |
| 2012/0237084 A1 | 9/2012 | De Lemos |

OTHER PUBLICATIONS

Thai V. Hoang, Text Extraction from Graphical Document Images Using Sparse Representation, DAS '10 Proceedings of the 9th IAPR International Workshop on Document Analysis Systems, 2010.

Cao et al., Separation of Overlapping Text from Graphics, Document Analysis and Recognition, 2001.

A. F. Mollah et al., Text/Graphics Separation for Business Card Images for Mobile Devices, IAPR International Workshop on Graphics Recognition (2009) 263-270.

Agnihotri, Lalitha, and Nevenka Dimitrova. "Text detection for video analysis." Content-Based Access of Image and Video Libraries, 1999. (CBAIVL'99) Proceedings. IEEE Workshop on. IEEE, 1999.

Bouman, Charles A. "Interpolation and Decimation." ECE 637: Digital Image Processing I. Purdue University, West Lafayette, IN. Jan. 10, 2011. Web. Aug. 19, 2014.

Pan, Feng; Huang, Jiwu; Discriminating computer graphics images and natural images using hidden Markov tree model, IWDW' 10 Proceedings of the 9th international conference on Digital watermarking, 2010.

* cited by examiner

SYSTEMS AND METHODS FOR QUANTIFYING GRAPHICS OR TEXT IN AN IMAGE

BACKGROUND

1. Field

The present disclosure generally relates to the quantification of graphics or text in an image.

2. Background

Images may include graphics and text. Some technologies recognize characters in an image (e.g., Optical Character Recognition), for example to determine the textual content in an image, but these technologies do not quantify the text and graphics in an image.

SUMMARY

Some embodiments of a method for selecting an image encoder comprise generating a grayscale histogram of an image, wherein the grayscale histogram includes a respective number of pixels for a plurality of histogram values; determining a respective percentage of pixels in each of the histogram values based on the numbers of pixels for the respective histogram value and a total number of pixels in the image; comparing the respective percentages of the histogram values to a first threshold; adding the respective percentages that exceed the first threshold to a total percentage; comparing the total percentage to a second threshold; and encoding the image with an encoder that is selected based on the second threshold.

Some embodiments of a method for quantifying an image comprise generating a histogram of an image, wherein the histogram includes a respective number of pixels for a plurality of histogram values; determining a respective percentage of pixels in each of the histogram values based on the numbers of pixels for the respective histogram value and a total number of pixels in the image; and generating a text/graphics score for the image based on the respective percentage of pixels in each of the histogram values.

Some embodiments of a device for quantifying an image comprise one or more computer-readable media configured to store images, and one or more processors configured to cause the device to perform operations including obtaining an image, generating a histogram of the image, calculating a distribution of pixel colors in the histogram, and determining that the image is one of a graphics image and a text image based on the distribution of pixel colors.

DESCRIPTION

The following disclosure describes certain explanatory embodiments. Additionally, the explanatory embodiments may include several novel features, and a particular feature may not be essential to practice the systems and methods described herein. Also, herein the conjunction "or" refers to an inclusive "or" instead of an exclusive "or", unless indicated otherwise.

Figure 1:
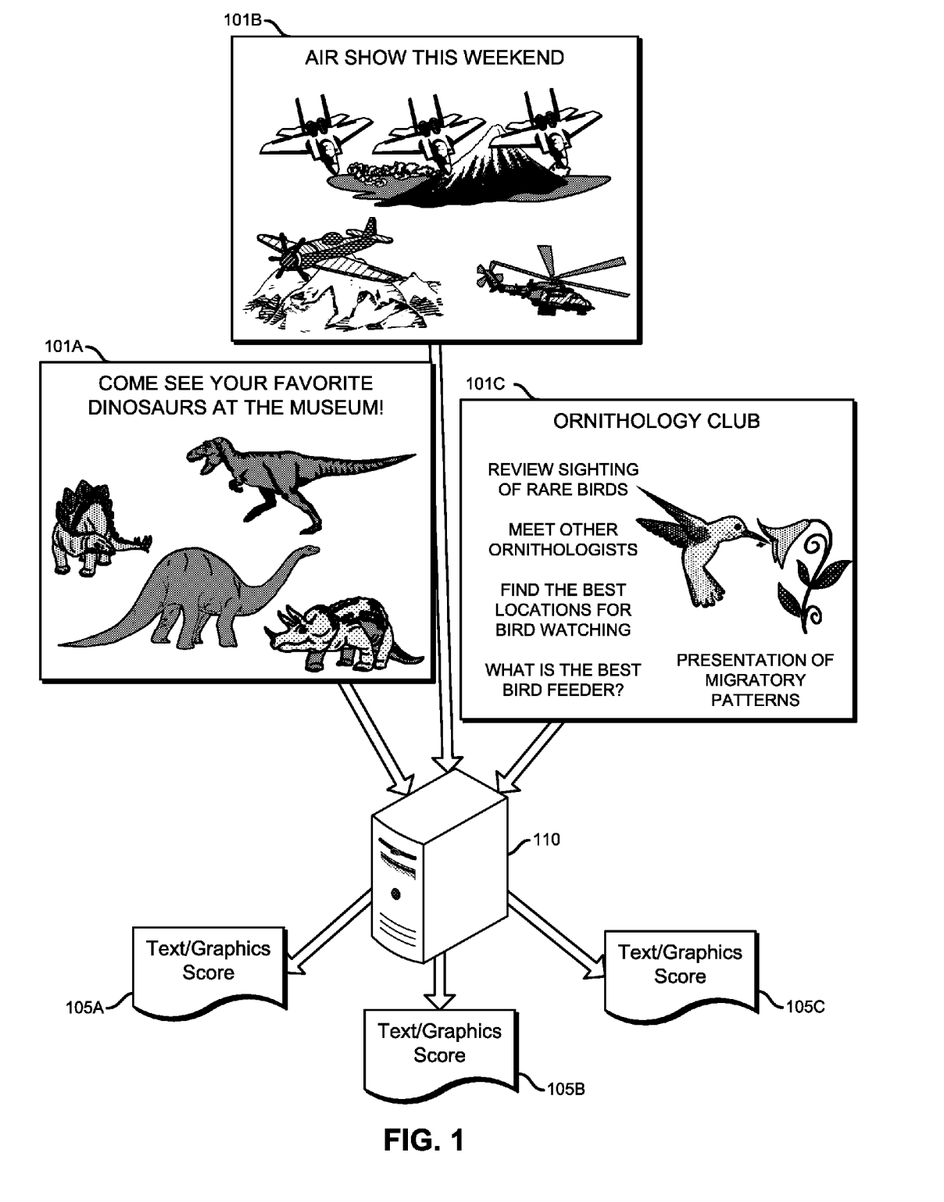
FIG. 1 illustrates an example embodiment of an image quantification system.

FIG. 1 illustrates an example embodiment of an image quantification system 110. The image quantification system 110 includes one or more computing devices (e.g., desktops, laptops, tablets, servers, PDAs, smart phones). The image quantification system 110 quantifies one or more of the graphics and text in images or regions of images. The image quantification system 110 generates a text/graphics score for an image that indicates the relationship between the quantity of the graphics and the quantity of the text in the image or the region of the image. For example, the text/graphics score may indicate whether the image or the region of the image has more text than graphics or more graphics than text.

The image quantification system 110 obtains one or more images 101, such as the three example images shown: the first image 101A, the second image 101B, and the third image 101C. The image quantification system 110 then generates a respective text/graphics score 105 for each of the obtained images. Also, a single image 101 may be divided into a plurality of regions, and a respective text graphics/score 105 may be generated for one or more of the regions. In this example, the image quantification system 110 generates a first text/graphics score 105A for the first image 101A, a second text/graphics score 105B for the second image 101B, and a third text/graphics score 105C for the third image 101C. The image quantification system 110 may not perform any recognition of the particular characters in an image, unlike Optical Character Recognition technologies, and instead may quantify the amount of text in an image, the amount of graphics in an image, or the relative amount of text versus graphics in an image in a corresponding text/graphics score 105.

After generating the text/graphics score 105, the image quantification system 110 may compare the text/graphics score 105 to one or more thresholds. Based on the comparison, the image quantification system 110 may select a text encoder or a graphics encoder. Also, the image quantification system 110 may identify an image 101 or a region of the image 101 as text or graphics, which may include labeling the image 101 or the region of the image 101 as text or graphics.

Figure 2:
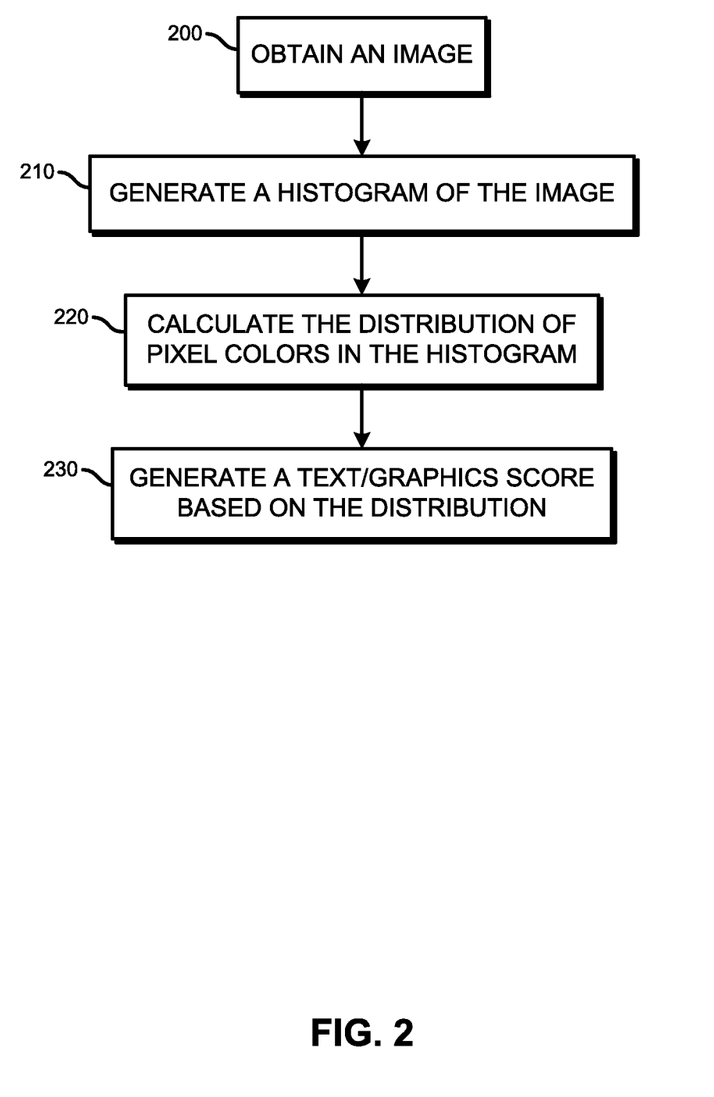
FIG. 2 illustrates an example embodiment of a method for quantifying an image.

FIG. 2 illustrates an example embodiment of a method for quantifying an image. Other embodiments of this method and the other methods described herein may omit blocks, add blocks, change the order of the blocks, combine blocks, or divide blocks into separate blocks. Also, this method and the other methods described herein may be implemented by the systems and devices described herein. The flow starts in block 200, where an image (or a region of an image) is obtained (e.g., obtained by an image quantification device via a network interface, from storage, from memory, from a camera, from a scanner). Next, in block 210, a histogram of the image (or the region) is generated. In some embodiments, the histogram is a grayscale histogram, and in some embodiments the histogram has a reduced color depth.

The flow then proceeds to block 220, where the distribution of pixel colors in the histogram is calculated. For example, the percentages of the pixels that have one or more respective color values may be calculated, such as a certain grayscale value, or a combination of a certain red value, a certain green value, and a certain blue value. Finally, in block 230, a text/graphics score is generated for the image (or the region) based on the distribution. Generating the text/graphics score may include determining the significant colors in the image based on the distribution and summing the distribution values of the significant colors.

Figure 3:
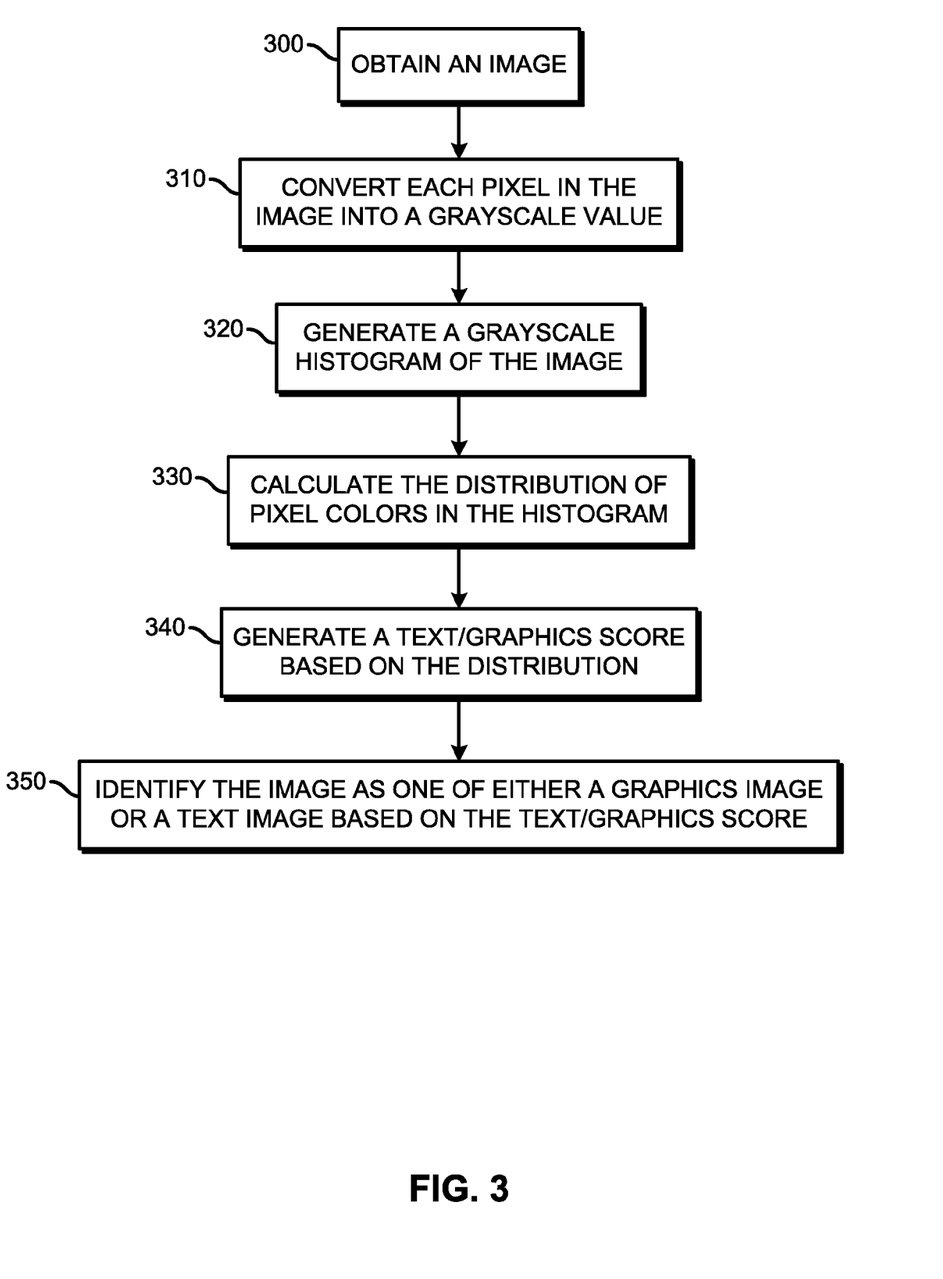
FIG. 3 illustrates an example embodiment of a method for quantifying an image.

FIG. 3 illustrates an example embodiment of a method for quantifying an image. The method starts in block 300, where an image (or a region of an image) is obtained. Next, in block 310, each pixel in the image (or the region) is converted into a grayscale value. For example, the respective RGB values for a pixel may be averaged to generate the grayscale value. Some embodiments represent each red value, each blue value, and each green value with a respective byte (for a total of 3 bytes per pixel), and a byte may have one of 256 values (0-255). Thus, in these embodiments, if the 3-byte information for a pixel is R=100, B=200, and G=0, then the average value is 100, which may be used as the grayscale value.

Proceeding to block 320, a grayscale histogram of the image (or the region) is generated. In some embodiments, this may be performed substantially concurrently with block 310. For example, a grayscale value may be added to the histogram before a subsequent grayscale value is calculated. The flow then moves to block 330, where the distribution of pixel colors in the histogram is calculated. For example, the respective percentage that each color contributes to the histogram is calculated.

The flow then moves to block 340, where a text/graphics score is generated based on the distribution. In some embodiments, generating the text/graphics score includes comparing the respective percentages to a threshold (e.g., 1%, 5%, 10%), and the percentages that are lower than the threshold are ignored. For example, some embodiments perform the following threshold comparison, where the threshold is 1%:

```
long total = totalPixels / 3 ;
    for (int i = 0; i <= 255; i++)
    {
        if (AvgHistogram[i] > 0)
        {
            long iPercent = (AvgHistogram[i] * 100 / total);
            if( iPercent > 1)
                Console.WriteLine("Average [" + i + "] " + iPercent + "%");
        }
    }
```

In some embodiments, the text/graphics score is generated by summing the respective percentages of the pixels that exceeded the threshold. In these embodiments, for example, if AvgHistogramPercentage[210]=54%, AvgHistogramPercentage[255]=4%, and AvgHistogramPercentage[2]=2%, then the text/graphics score=60%.

Finally, in block 350, the image (or the region) is identified as one of either a graphics image (or region) or a text image (or region) based on the text/graphics score. For example, in some embodiments, if an image (or region) has lots of graphics, the color is more widely distributed, and, consequently, the percentages of most of the pixel values will be less than 1%. If the text/graphics score is within a predetermined threshold of 0%, then there is more color distribution, and the image (or the region) may be identified as a graphics image (or region). If an image (or region) has mostly text or has less graphics, the image (or the region) will have less distribution of colors or a significant percentage of main colors. In these embodiments, if the text/graphics score is within a predetermined threshold of 100%, then there is less distribution of colors, and the image (or the region) may be identified as a non-graphic image (or region) or a text image (or region).

Figure 4:
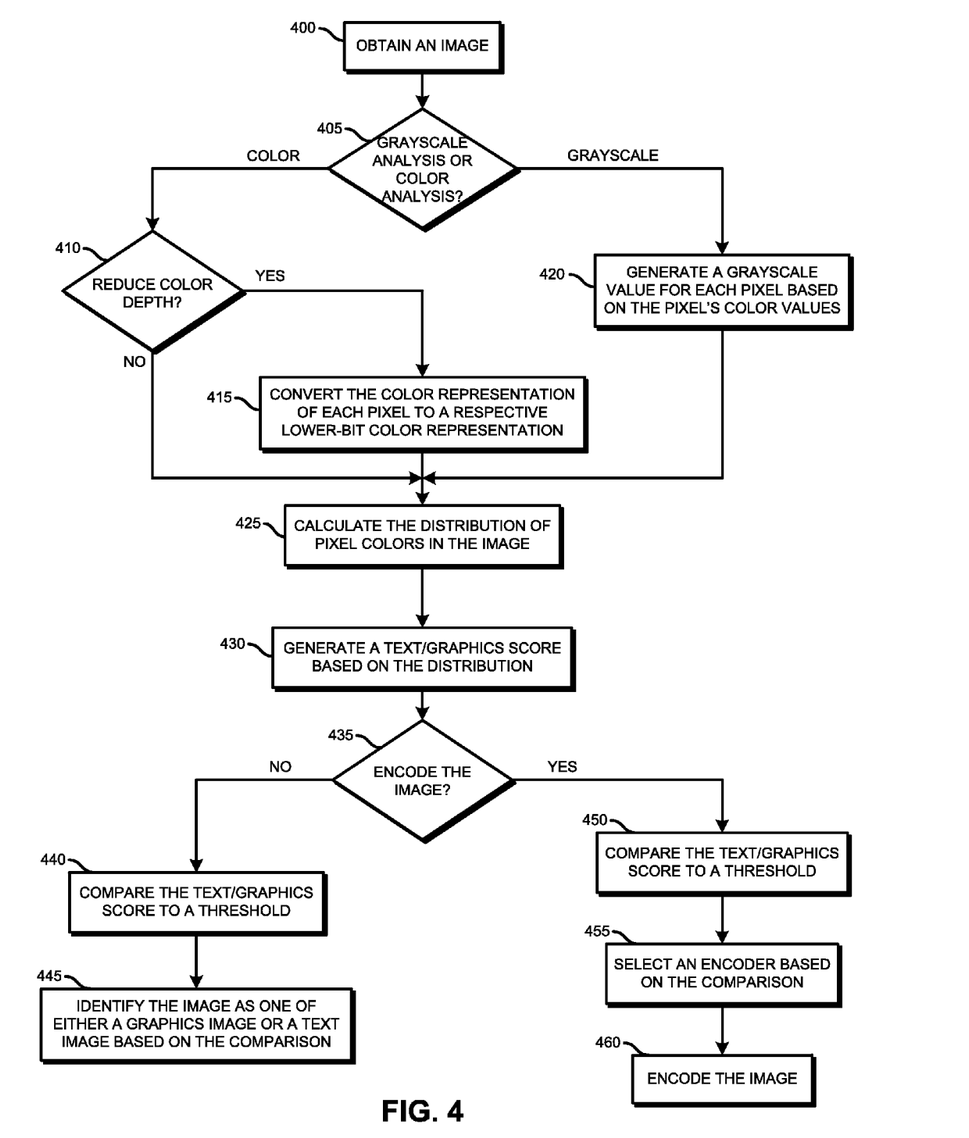
FIG. 4 illustrates an example embodiment of a method for quantifying an image.

FIG. 4 illustrates an example embodiment of a method for quantifying an image. The flow starts in block 400, where an image is obtained. Also, some embodiments of this method and the other methods described herein operate on one or more regions of an image. Next, in block 405, it is determined (e.g., determined by an image quantification device) if grayscale analysis will be performed or if color analysis will be performed. If color analysis will be performed, the flow proceeds to block 410, where it is determined if the color depth will be reduced. If the color depth will not be reduced (block 415=no), then the flow proceeds to block 425. If the color depth will be reduced (block 410=yes), then the flow proceeds to block 415. In block 415, the color representation of each pixel is converted to a lower-bit color representation. For example, a 24-bit color depth may be converted to an 8-bit color depth. The flow then proceeds to block 425.

If in block 405 it is determined that grayscale analysis will be performed, then from block 405 the flow proceeds to block 420. In block 420, a grayscale value is generated for each pixel based on the pixel's respective color values. The flow then proceeds to block 425.

In block 425, the distribution of pixel colors in the image is calculated. The flow then moves to block 430, where a text/graphics score is generated based on the distribution. Next, in block 435, it is determined if the image will be encoded. If the image will not be encoded (block 435=no), then the flow proceeds to block 440, where the text/graphics score is compared to a threshold. Afterwards, in block 445, the image is identified as one of either a graphics image or a text image based on the comparison.

If the image will be encoded (block 435=yes), then the flow proceeds to block 450, where the text/graphics score is compared to a threshold. Following, in block 455, an encoder is selected based on the comparison. Finally, in block 460, the selected encoder is used to encode the image.

Figure 5A:
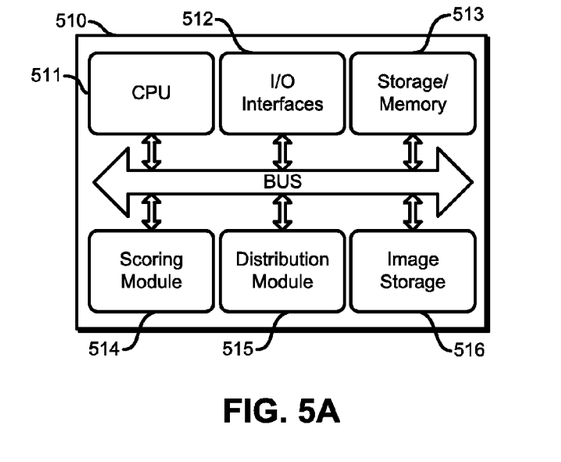
FIG. 5A illustrates an example embodiment of an image quantification system.

FIG. 5A illustrates an example embodiment of an image quantification system. The system includes an image quantification device 510. The image quantification device 510 includes one or more processors (CPU) 511, one or more I/O interfaces 512, storage/memory 513, and image storage 516. The CPU 511 includes one or more central processing units, which may include microprocessors (e.g., single core microprocessors, multi-core microprocessors) and other electronic circuits, and is configured to read and perform computer-executable instructions, such as instructions stored in storage, in memory, or in modules. The computer-executable instructions may include those for the performance of the methods described herein. The one or more I/O interfaces 512 provide communication interfaces to input and output devices, which may include a keyboard, a display, a mouse, a printing device, a touch screen, a light pen, an optical storage device, a scanner, a microphone, a camera, a drive, and a network (either wired or wireless).

The storage/memory 513 includes one or more computer-readable or computer-writable media, for example a computer-readable storage medium. A computer-readable storage medium is a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid state drive, SRAM, DRAM, EPROM, EEPROM). The storage/memory 513 may store computer-readable data or computer-executable instructions. Also, image storage 516 includes one or more computer-readable media that store images. The components of the image quantification device 510 communicate via a bus.

The image quantification device 510 also includes a scoring module 514 and a distribution module 515. Modules include logic, computer-readable data, or computer-executable instructions. Modules may be implemented in software (e.g., Assembly, C, C++, C#, Java, BASIC, Perl, Visual Basic) or firmware stored on one or more computer-readable media, in hardware (e.g., customized circuitry), or in a combination of software and hardware. In some embodiments, the image quantification device 510 includes additional or fewer modules, the modules are combined into fewer modules, or the modules are divided into more modules. Though the computing device or computing devices that execute the instructions that are stored in a module actually perform the operations, for purposes of description a module may be described as performing one or more operations. The scoring module 514 includes instructions that, when executed by the image quantification device 510, cause the image quantification device 510 to generate text/graphics scores for respective images (or regions of images) based on the images' respective histograms or distributions of pixel colors. The distribution module 515 includes instructions that, when executed by the image quantification device 510, cause the image quantification device 510 to generate image histograms, calculate the distributions of pixel colors of respective images, convert colors to grayscale, or reduce the color depth of an image.

Figure 5B:
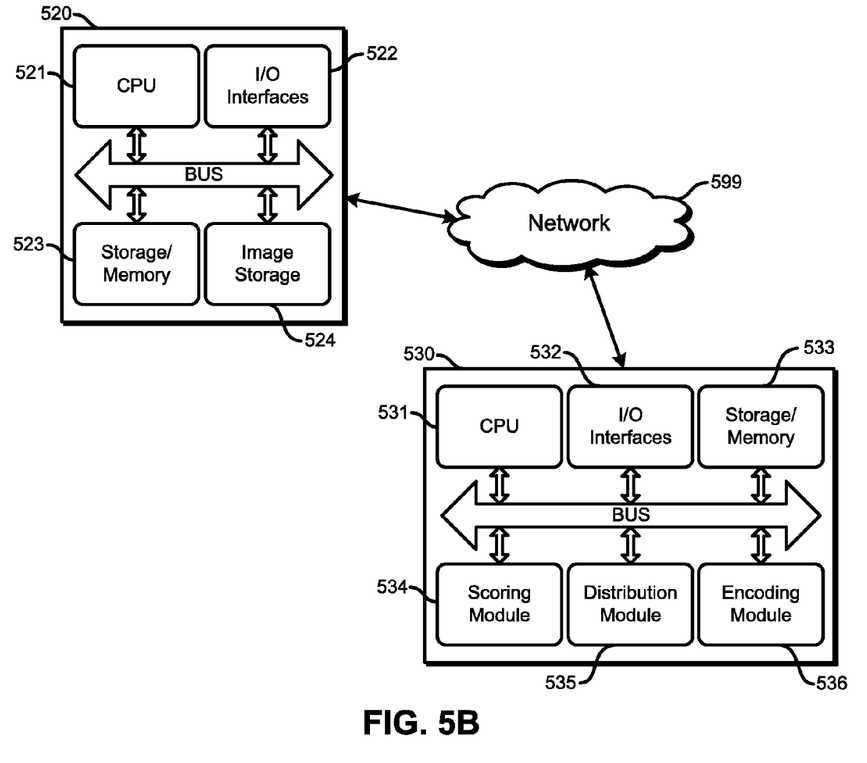
FIG. 5B illustrates an example embodiment of an image quantification system.

FIG. 5B illustrates an example embodiment of an image quantification system. The system includes an image storage device 520 and an image quantification device 530, which communicate via a network 599. For example, the image quantification device 530 may obtain images from the image storage device 520 via the network 599. The image storage device 520 includes one or more CPUs 521, one or more I/O interfaces 522, storage/memory 523, and image storage 524. The image quantification device 530 includes one or more CPUs 531, one or more I/O interfaces 532, storage/memory 533, a scoring module 534, a distribution module 535, and an encoding module 536. The encoding module 536 includes instructions that, when executed by the image quantification device 530, cause the image quantification device 530 to encode an image. The encoding module 536 may include instructions that implement different encoding techniques or algorithms, for example, instructions optimized for encoding text images or instructions optimized for encoding graphics images.

Figure 6:
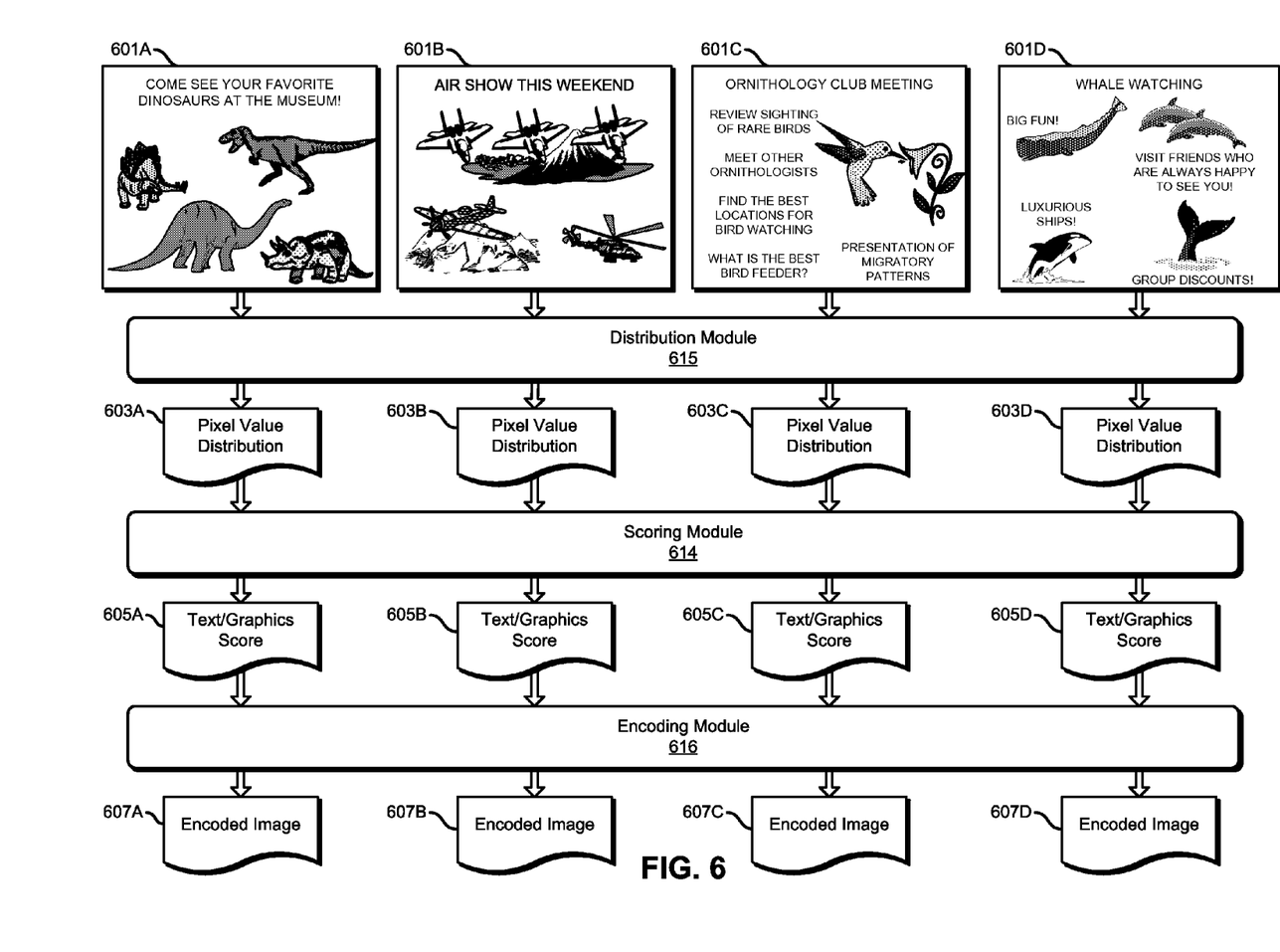
FIG. 6 illustrates an example embodiment of the flow of operations in an image quantification system.

FIG. 6 illustrates an example embodiment of the flow of operations in an image quantification system. Though the system includes one or more CPUs, one or more I/O interfaces, storage, and memory, these components are not shown in FIG. 6. The system also includes a distribution module 615, a scoring module 614, and an encoding module 616. One or more images, for example a first image 601A, a second image 601B, a third image 601C, or a fourth image 601D, are received by the distribution module 615. For each received image 601, the distribution module 615 generates a respective pixel value distribution 603, for example pixel value distributions 603A-D. The distribution module 615 may also generate a respective histogram for each image, convert pixel color values to grayscale values, or reduce color bit depth.

The scoring module 614 receives one or more pixel value distributions 603, for example pixel values distributions 603A-D, and, based on the received pixel value distributions 603, generates respective text/graphics scores 605, for example text/graphics scores 605A-D. The encoding module 616 then receives the text/graphics scores 605 and the respective images 601 and then generates respective encoded images 607, for example encoded images 607A-D.

Figure 7:
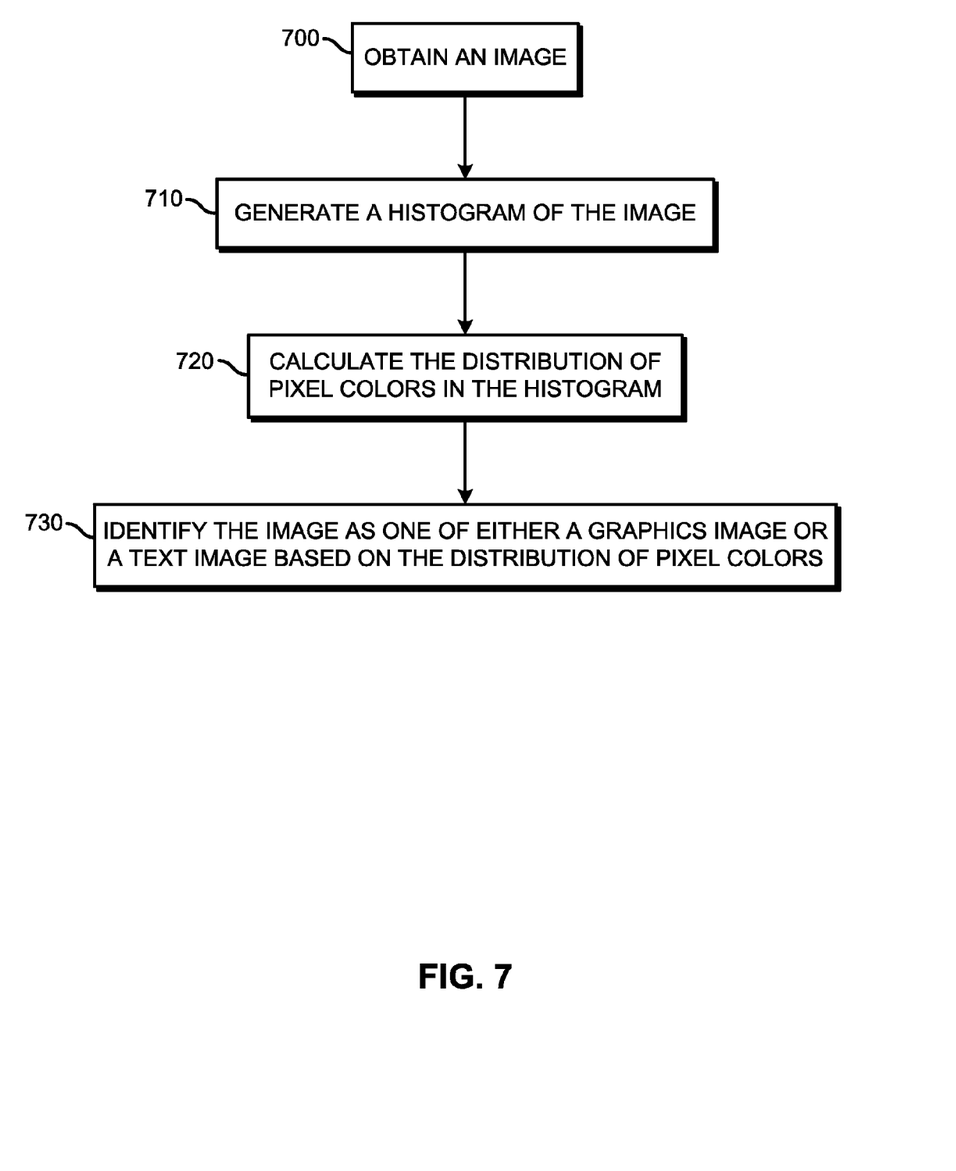
FIG. 7 illustrates an example embodiment of a method for quantifying an image.

FIG. 7 illustrates an example embodiment of a method for quantifying an image. The flow starts in block 700, where an image is obtained. Next, in block 710, a histogram of the image is generated (e.g., a grayscale histogram, a color histogram). The flow then proceeds to block 720, where the distribution of pixel colors in the histogram is calculated. Finally, in block 730, the image is identified as one or either a graphics image or a text image based on the distribution of pixel colors.

The above described devices, systems, and methods can be implemented by supplying one or more computer-readable media that contain computer-executable instructions for realizing the above described operations to one or more computing devices that are configured to read the computer-executable instructions and execute them. The systems or devices perform the operations of the above-described embodiments when executing the computer-executable instructions. Also, an operating system on the one or more systems or devices may implement at least some of the operations of the above-described embodiments. Thus, the computer-executable instructions or the one or more computer-readable media that contain the computer-executable instructions constitute an embodiment.

Any applicable computer-readable medium can be employed as a computer-readable medium for the computer-executable instructions. A computer-readable medium may include a computer-readable storage medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) or a transitory computer-readable medium, which includes a transitory propagating signal (e.g., a carrier wave). Also, the computer-executable instructions may be stored in a computer-readable storage medium provided on a function-extension board inserted into the device or on a function-extension unit connected to the device, and a CPU provided on the function-extension board or unit may implement the operations of the above-described embodiments.

The scope of the claims is not limited to the above-described embodiments and includes various modifications and equivalent arrangements.

What is claimed is:

1. A method for selecting an image encoder, the method comprising:
    generating a grayscale histogram of an image, wherein the grayscale histogram includes a respective number of pixels for a plurality of histogram values;
    determining a respective percentage of pixels in each of the histogram values based on the number of pixels for the respective histogram value and a total number of pixels in the image;
    comparing the percentages of pixels in the histogram values to a first threshold;
    adding the percentages of pixels in the histogram values that exceed the first threshold to a total percentage;
    comparing the total percentage to a second threshold; and
    encoding the image with an encoder that is selected based on the second threshold.

2. The method of claim 1, further comprising
    encoding the image with a text encoder if the total percentage is greater than the second threshold; and
    encoding the image with a graphics encoder if the total percentage is less than the second threshold.

3. The method of claim 1, wherein generating the grayscale histogram comprises averaging two or more color component values for a pixel.

4. The method of claim 3, wherein the colors associated with the two or more color component values are red, green, and blue.

5. The method of claim 1, wherein the first threshold is 1%.

6. The method of claim 1, wherein the second threshold is 50%.

7. A method for quantifying an image, the method comprising:
   generating a histogram of an image, wherein the histogram includes a respective number of pixels for a plurality of histogram values;
   determining a respective percentage of pixels in each of the histogram values based on the number of pixels for the respective histogram value and a total number of pixels in the image; and
   generating a text/graphics score for the image based on the respective percentage of pixels in each of the histogram values, wherein generating the text/graphics score includes comparing the percentages of pixels in the histogram values to a first threshold and adding the respective percentages that exceed the first threshold to a total percentage.

8. The method of claim 7, wherein the first threshold is 2%.

9. The method of claim 7, further comprising comparing the text/graphics score to a second threshold; and
   labeling the image as either a text image or a graphics image based on the comparison of the text/graphics score to the second threshold.

10. The method of claim 9, wherein the second threshold is 60%.

11. The method of claim 9, wherein the image is labeled a text image if the text/graphics score is greater than the threshold, and wherein the image is labeled a graphics image if the text/graphics score is less than the threshold.

12. The method of claim 7, further comprising reducing a color depth of the image.

13. A device for quantifying an image, the device comprising:
   one or more computer-readable media configured to store images; and
   one or more processors configured to cause the device to perform operations including
      obtaining an image,
      generating a histogram of the image, wherein the histogram includes a respective number of pixels for a plurality of histogram values,
      determining respective percentages of pixels in the histogram values based on the number of pixels for the respective histogram value and a total number of pixels in the image, and
      generating an image score for the image based on the respective percentages of pixels in the histogram values, wherein generating the image score includes comparing the respective percentages of pixels in the histogram values to a first threshold and adding the respective percentages that exceed the first threshold to a total percentage.

14. The device of claim 13, wherein the one or more processors are further configured to cause the device to convert the image to a grayscale image.

15. The device of claim 13, wherein the one or more processors are further configured to cause the device to
   determine that the image is one of a graphics image and a text image based on the image score; and
   encode the image based on whether the image is a text image or a graphics image.

* * * * *